(12) United States Patent
Klein et al.

(10) Patent No.: US 8,027,767 B2
(45) Date of Patent: Sep. 27, 2011

(54) METHOD FOR CONTROLLING A VEHICLE STEERING SYSTEM

(75) Inventors: Steven D. Klein, Munger, MI (US);
Michael K. Hales, Midland, MI (US)

(73) Assignee: Nexteer (Beijing) Technology Co., Ltd.

( * ) Notice: Subject to any disclaimer, the term of this patent is extended or adjusted under 35 U.S.C. 154(b) by 0 days.

(21) Appl. No.: 12/570,894

(22) Filed: Sep. 30, 2009

(65) Prior Publication Data
US 2010/0023221 A1  Jan. 28, 2010

Related U.S. Application Data

(63) Continuation of application No. 11/756,235, filed on May 31, 2007, now Pat. No. 7,676,310.

(60) Provisional application No. 60/867,869, filed on Nov. 30, 2006.

(51) Int. Cl.
*G06F 19/00* (2006.01)
*B62D 6/00* (2006.01)

(52) U.S. Cl. ............ 701/42; 701/35; 180/411; 180/204; 280/761; 340/465; 116/31

(58) Field of Classification Search .............. 701/41, 701/43, 42, 35; 280/761; 180/408, 410, 180/418, 433, 411, 204, 443; 340/465; 116/31
See application file for complete search history.

(56) References Cited

U.S. PATENT DOCUMENTS

| | | | |
|---|---|---|---|
| 5,850,616 A * | 12/1998 | Matsuno et al. | 701/82 |
| 6,611,744 B1 * | 8/2003 | Shimazaki et al. | 701/41 |
| 6,637,544 B2 | 10/2003 | Stevens et al. | |
| 6,728,615 B1 * | 4/2004 | Yao et al. | 701/41 |
| 6,926,114 B2 | 8/2005 | Bolourchi et al. | |
| 7,075,456 B2 | 7/2006 | Tanaka et al. | |
| 7,085,634 B2 | 8/2006 | Endo et al. | |
| 7,089,101 B2 * | 8/2006 | Fischer et al. | 701/41 |
| 7,099,758 B2 | 8/2006 | Tanaka et al. | |
| 7,100,735 B2 | 9/2006 | Burton et al. | |
| 7,117,073 B2 | 10/2006 | Endo et al. | |

(Continued)

FOREIGN PATENT DOCUMENTS

CN  1323865 C  *  7/2007

(Continued)

OTHER PUBLICATIONS

Automotive Ultrasonic Array Emitter for Short-range Targets Detection; Hatano, H. et al.; Wireless Communication Systems, 2007. ISWCS 2007. 4th International Symposium on; Digital Object Identifier: 10.1109/ISWCS.2007.4392361; Publication Year: 2007 , pp. 355-359.*

(Continued)

*Primary Examiner* — Cuong H Nguyen
(74) *Attorney, Agent, or Firm* — Cantor Colburn LLP

(57) ABSTRACT

Systems and methods for controlling a vehicle steering system are provided. In one exemplary embodiment, the method includes receiving a desired front road wheel angle signal at a controller. The desired front road wheel angle signal is indicative of a desired front road wheel angle of vehicle wheels. The method further includes receiving a parking assist request signal at the controller indicating a parking assist operational mode is desired. The method further includes generating a desired motor torque signal for controlling a power steering motor in the parking assist operational mode utilizing the controller, based on the desired front road wheel angle signal and the parking assist request signal.

3 Claims, 9 Drawing Sheets

U.S. PATENT DOCUMENTS

| | | | |
|---|---|---|---|
| 7,155,325 B2 | 12/2006 | Tanaka et al. | |
| 7,234,564 B2* | 6/2007 | Farrelly et al. | 180/412 |
| 7,392,121 B2* | 6/2008 | Arima et al. | 701/41 |
| 7,472,005 B2 | 12/2008 | Ephraim | |
| 7,676,310 B2* | 3/2010 | Klein et al. | 701/41 |
| 7,825,828 B2* | 11/2010 | Watanabe et al. | 340/932.2 |
| 2002/0016657 A1 | 2/2002 | Iwazaki | |
| 2004/0267423 A1* | 12/2004 | Iwazaki et al. | 701/41 |
| 2007/0021888 A1* | 1/2007 | Ephraim | 701/41 |
| 2008/0109134 A1* | 5/2008 | Bolourchi et al. | 701/41 |
| 2008/0133087 A1* | 6/2008 | Klein et al. | 701/41 |
| 2010/0023221 A1* | 1/2010 | Klein et al. | 701/42 |

FOREIGN PATENT DOCUMENTS

| | | | |
|---|---|---|---|
| DE | 602007011872 E * | 2/2011 | |
| EP | 1160146 A2 * | 12/2001 | |
| EP | 1462314 A1 | 9/2004 | |
| EP | 1683707 A1 | 7/2006 | |
| EP | 1927529 A2 * | 6/2008 | |
| JP | 2004345528 A * | 12/2004 | |
| JP | 2007106194 A * | 4/2007 | |
| WO | WO2005063550 A1 | 7/2005 | |

OTHER PUBLICATIONS

Development of an Expert System for the Trim Die Design in Automotive Industry; Sang-Jun Lee et al.; Computer Supported Cooperative Work in Design, 2006. CSCWD '06. 10th International Conference on; Digital Object Identifier: 10.1109/CSCWD.2006.253168; Publication Year: 2006, pp. 1-5.*

Automatic parallel parking; Lo, Y.K. et al.;Intelligent Transportation Systems, 2003. Proceedings. 2003 IEEE vol. 2; Publication Year: 2003, pp. 1190-1193 vol. 2.*

Making driver modeling attractive; Pellecchia, A. et al.; Intelligent Systems, IEEE ; vol. 20, Issue: 2 Digital Object Identifier: 10.1109/MIS.2005.31; Publication Year: 2005, pp. 8-12.*

Control, Computing and Communications: Technologies for the Twenty-First Century Model T; Cook, J.A.; Kolmanovsky, I.V.; McNamara, D.; Nelson, E.C.; Prasad, K.V.; Proceedings of the IEEE; vol. 95, Issue 2, Feb. 2007 pp. 334-355 Digital Object Identifier 10.1109/JPROC.2006.888384.*

Scanning Advanced Automobile Technology; Gharavi, H.; Prasad, K.V.; Ioannou, P.; Proceedings of the IEEE vol. 95, Issue 2, Feb. 2007 pp. 328-333.*

Automated Vehicle Mobile Guidance System for Parking Assistance; Hashimoto, N.; Kato, S.; Minobe, N.; Tsugawa, S.; Intelligent Vehicles Symposium, 2007 IEEE; Jun. 13-15, 2007 pp. 630-635; Digital Object Identifier 10.1109/IVS.2007.4290186.*

On-line time-scaling control of a kinematic car with one input; Kiss, B.; Szadeczky-Kardoss, E.; Control & Automation, 2007. Med '07. Mediterranean Conference on; Jun. 27-29, 2007 pp. 1-6 ; Digital Object Identifier 10.1109/MED.2007.4433947.*

Active Steering Unit with Integrated ACC for X-By-Wire Vehicles Using a Joystick As H.M.I; Kelber, C.R.; Webber, W.; Gomes, G.K.; Lohmann, M.A.; Rodrigues, M.S.; Ledur, D.; Intelligent Vehicles Symposium, 2004 IEEE, Jun. 14-17, 2004 pp. 173-177; Digital Object Indentifier 10.1109/IVS.2004.1336376 (Accessible to the USPTO via U.S. Appl. No. 11/756,235, filed May 31, 2007).

Electrical Drives in Intelligent Vehicles: Basis for Active Driver Assistance Systems; Kelber, C.R.; Jung, C.R.; Osorio, F.S.; Heinen, F.J.; Industiral Electronics, 2005. ISIE 2005. Proceedings of the IEEE International Symposium on vol. 4, Jun. 20-23, 2005 Page(s): 1623-1628 (Accessible to the USPTO via U.S. Appl. No. 11/756,235, filed May 31, 2007).

On-center handling characteristics of MDPS system for environmental vehicle; Hae-Ryong Choi; Hong-Seok Song; Hogi Kim; Industry Applications Conference 2005. Fourtieth IAS Annual Meeting. Conference Record of the 2005; vol. 3, Oct. 2-6, 2005; pp. 2049-2053, vol. 3; Digital Object Identifier 10.1109/IAS.2005 1518729 (Accessible to the USPTO via U.S. Appl. No. 11/756,235, filed May 31, 2007).

Brushless DC Motor Drive for Steer-By-Wire and Electric Power Steering Application; Rodriguez, F.; Uy, E.; Emandi, A.; Electrical Insulation Conference and Electrical Manufacturing & Coil Winding Technology Conference, 2003. Proceedings Sep. 23-25, 2003 pp. 535-541 (Accessible to the USPTO via U.S. Appl. No. 11/756,235, filed May 31, 2007).

On-line time-scaling control of a kinematic car with one input; Kiss, B.; Szadecky-Kardoss, E.; Control & Automation, 2007. MED '07. Mediterranean Conference on; Jun. 27-29, 2007 pp. 1-6; Digital Object Identifier 10.1109/ MED.2007.4433947 (Accessible to the USPTO via U.S. Appl. No. 11/756,235, filed May 31, 2007).

Modeling and Nonlinear Control of an Electrohydraulic Closed-Center Power-Steering System; Kemmetmuller, W.; Kugi, A.; Muller, S.; Decision and Control, 2005 and 2005 European Control Conference. CDC-ECC '05. 44th IEEE Conference on Dec. 12-15, 2005; pp. 5077-5082 (Accessible to the USPTO via U.S. Appl. No. 11/756,235, filed May 31, 2007).

European Search Report dated Oct. 29, 2008 for European Application No. 07120989.4-1264/1927529.

* cited by examiner

METHOD FOR CONTROLLING A VEHICLE STEERING SYSTEM

CROSS REFERENCE TO RELATED APPLICATIONS

This application is a Continuation of U.S. Non-Provisional application, Ser. No. 11/756,235, filed May 31, 2007, and claims the benefit of Provisional application, Ser. No. 60/867,869, filed Nov. 30, 2006, the contents of both being incorporated by reference herein.

TECHNICAL FIELD

This application relates to systems and methods for controlling a vehicle steering system.

BACKGROUND

Controllers other than steering controllers have been utilized to transmit a steering torque signal to a steering controller. In response, the steering controller outputs a control signal indicative of the steering torque signal to a steering system to adjust a position of the vehicle wheels. A problem associated with this approach is that if communication is interrupted between the steering controller and the other controllers, the steering controller could adjust a position of the vehicle wheels to an undesirable position. In particular, during a parking assist mode of operation, if communication is interrupted between the steering controller and the other controllers, the steering controller could adjust a position of the vehicle wheels to an undesirable position.

Accordingly, the inventors herein have recognized a need for systems and methods for controlling a vehicle steering system that minimizes and/or eliminates the foregoing problem.

SUMMARY OF THE INVENTION

A method for controlling a vehicle steering system in accordance with an exemplary embodiment is provided. The method includes receiving a desired front road wheel angle signal at a controller. The desired front road wheel angle signal is indicative of a desired front road wheel angle of vehicle wheels. The method further includes receiving a parking assist request signal at the controller indicating a parking assist operational mode is desired. The method further includes generating a desired motor torque signal for controlling a power steering motor in the parking assist operational mode utilizing the controller, based on the desired front road wheel angle signal and the parking assist request signal.

A system for controlling a vehicle steering system in accordance with another exemplary embodiment is provided. The system includes a power steering motor operably coupled to the vehicle steering system. The system further includes a controller configured to control operation of the power steering controller. The controller is configured to receive a desired front road wheel angle signal. The desired front road wheel angle signal is indicative of a desired front road wheel angle of vehicle wheels. The controller is further configured to receive a parking assist request signal indicating a parking assist operational mode is desired. The controller is further configured to generate a desired motor torque signal for controlling the power steering motor in the parking assist operational mode, based on the desired front road wheel angle signal and the parking assist request signal.

A method for enabling a parking assist operational mode of a vehicle steering system in accordance with another exemplary embodiment is provided. The method includes receiving a parking assist request signal at a controller indicating a parking assist operational mode is desired. The method further includes receiving a vehicle speed signal indicative of a vehicle speed at the controller. The method further includes receiving a handwheel torque signal indicative of an amount of torque applied to a vehicle handwheel at the controller. The method further includes generating a parking assist enable signal to enable the parking assist operational mode, utilizing the controller when the parking assist request signal is received, and the vehicle speed signal indicates a vehicle speed is less than a first threshold vehicle speed, and the handwheel torque signal indicates an amount of handwheel torque is less than a threshold handwheel torque.

A system for enabling a parking assist operational mode of a vehicle steering system in accordance with another exemplary embodiment is provided. The system includes a vehicle speed sensor configured to generate a vehicle speed signal indicative of a vehicle speed. The system further includes a handwheel torque sensor configured to generate a handwheel torque signal indicative of an amount of torque applied to a vehicle handwheel. The method further includes a controller configured to receive the vehicle speed signal and the handwheel torque signal. The controller is further configured to receive a parking assist request signal indicating a parking assist operational mode is desired. The controller is further configured to generate a parking assist enable signal to enable the parking assist operational mode, when the parking assist request signal is received, and the vehicle speed signal indicates a vehicle speed is less than a first threshold vehicle speed, and the handwheel torque signal indicates the amount of handwheel torque is less than a threshold handwheel torque.

A method for controlling a vehicle steering system in accordance with another exemplary embodiment is provided. The method includes initiating a power steering operational mode, utilizing a controller, to assist an operator in adjusting an operational position of vehicle wheels in response to a vehicle handwheel position. The method further includes initiating a parking assist operational mode to automatically control the operational position of vehicle wheels during vehicle parking while maintaining the power steering operational mode utilizing the controller, such that when the vehicle is being automatically parked and an operator applies a torque to a vehicle handwheel the position of vehicle wheels is adjusted based on the torque.

A system for controlling a vehicle steering system in accordance with another exemplary embodiment is provided. The system includes a controller configured to initiate a power steering operational mode to assist an operator in adjusting an operational position of vehicle wheels in response to a vehicle handwheel position. The controller is further configured to initiate a parking assist operational mode to automatically control the operational position of vehicle wheels during vehicle parking while maintaining the power steering operational mode utilizing the controller, such that when the vehicle is being automatically parked and an operator applies a torque to a vehicle handwheel the position of vehicle wheels is adjusted based on the torque.

DESCRIPTION OF EXEMPLARY EMBODIMENTS

Figure 1:
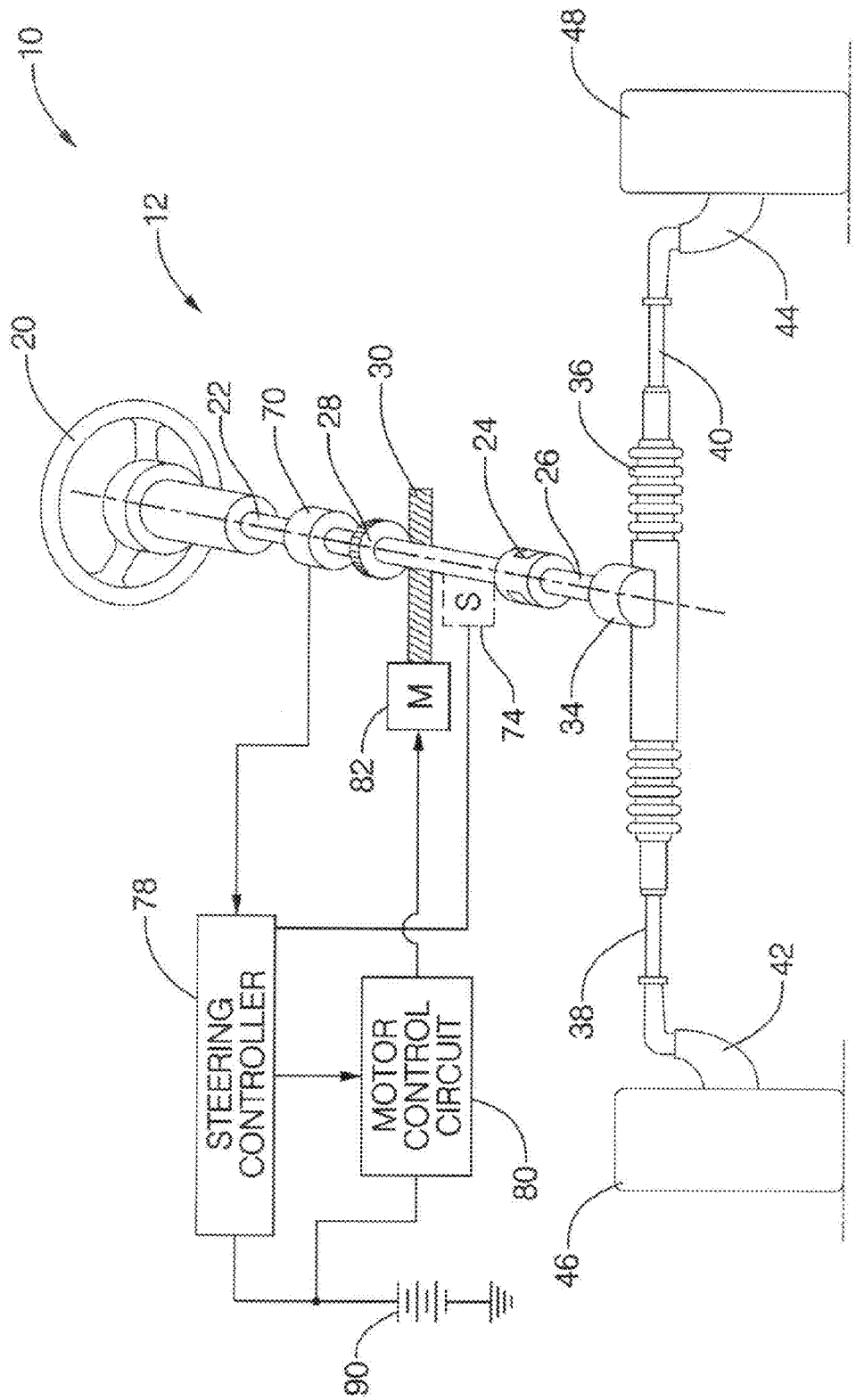
FIG. 1 is a schematic of a vehicle having a steering system and a control system in accordance with an exemplary embodiment.
Figure 2:
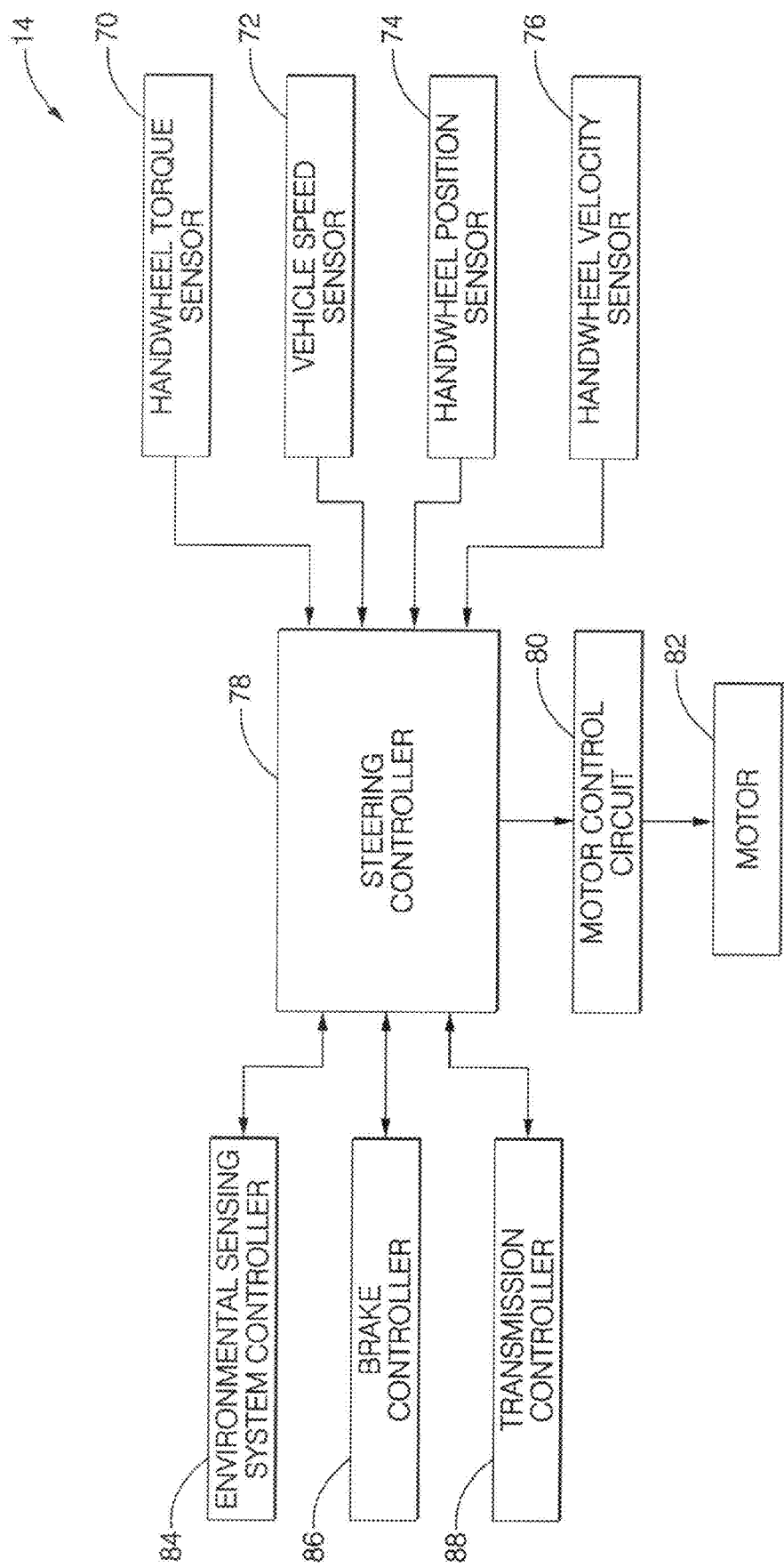
FIG. 2 is a block diagram of the control system.
Figure 3:
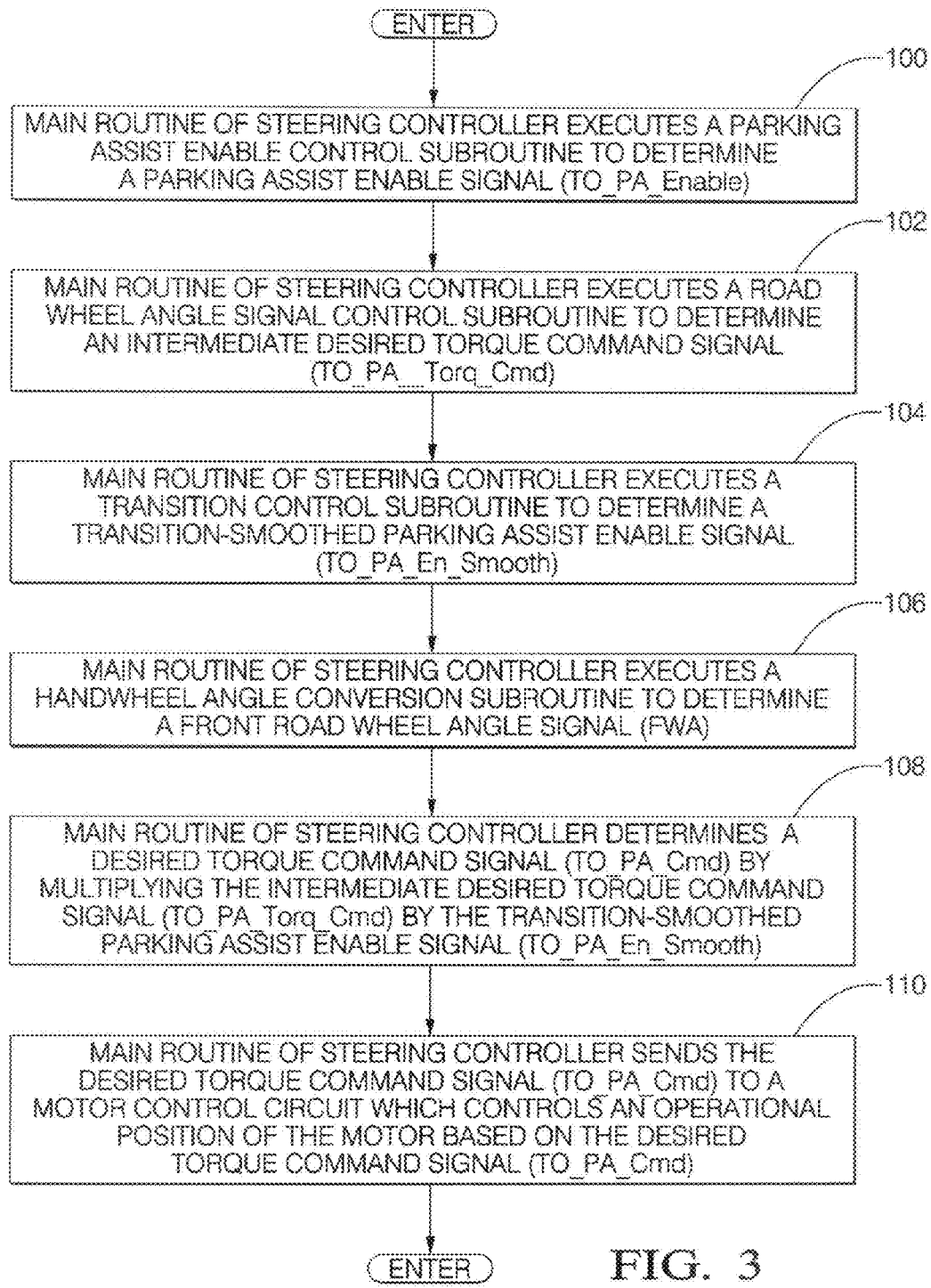
FIGS. 3-9 are flowcharts of methods for controlling the steering system in accordance with another exemplary embodiment.

Referring to FIGS. 1 and 2, a vehicle 10 having a steering system 12 and a control system 14 is illustrated. For purposes of understanding, the term "signal" utilized herein is defined as any electrical signal or any stored or transmitted value. For example, a signal can comprise a voltage, or a current. Further, a signal can comprise any stored or transmitted value such as binary values, scalar values, or the like.

The steering system 12 is provided to steer the vehicle 10 in a desired direction. The steering system includes a handwheel 20, an upper steering shaft 22, a universal joint 24, a lower steering shaft 26, a worm gear 28, a worm 30, a gear housing 34, a steering mechanism 36, tie rods 38, 40, steering knuckles 42, 44, and roadway wheels 46, 48. In one exemplary embodiment, the steering system 12 is an electric power steering system that utilizes a rack and pinion steering mechanism 36. The steering mechanism 36 includes a toothed rack (not shown) and a pinion gear (not shown) located under the gear housing 34. During operation, as the handwheel 20 is turned by a vehicle operator, the upper steering shaft 22 connected to the lower steering shaft 26 turns the pinion gear. Rotation of the pinion gear moves the toothed rack which moves the tie rods 39, 40 which in turn moves the steering knuckles 42, 44, respectively, which turns the roadway wheels 46, 48, respectively.

Referring to FIG. 2, the control system 14 is provided to assist in controlling the steering system 12. In particular, the control system 14 provides: (i) electric power steering assist for assisting a vehicle operator in steering the vehicle, and (ii) automatic control of the steering direction of the vehicle during a parking assist mode of operation in which the vehicle is automatically parked. The control system 14 includes a handwheel torque sensor 70, a vehicle speed sensor 72, a handwheel position sensor 74, a handwheel velocity sensor 76, a steering controller 78, a motor control circuit 80, an environment sensing system 84, a brake controller 86, a transmission controller 88, and a battery 90.

The handwheel torque sensor 70 is provided to generate a signal (HW_Torq) indicative of an amount of torque being applied to the vehicle handwheel 20 by a vehicle operator. In one exemplary embodiment, the handwheel torque sensor 70 includes a torsion bar (not shown) which outputs a variable-resistance signal to the controller 78 based on an amount of twist of the torsion bar. Of course, in alternative embodiments, other types of torque sensors known to those skilled in the art could be utilized.

The vehicle speed sensor 72 is provided to generate a signal indicative of a speed of the vehicle 10. The vehicle speed sensor 72 operably communicates with the steering controller 78.

The handwheel position sensor 74 is provided to generate a signal indicative of a rotational or angular position of the handwheel 20. The handwheel position sensor 74 operably communicates with the steering controller 78.

The handwheel velocity sensor 76 is provided to generate a signal indicative of a rotational velocity of the handwheel 20. The handwheel velocity sensor 76 operably communicates with the steering controller 78.

The steering controller 78 is provided to generate control signals that are received by the motor control circuit 80 for controlling operation of the motor 82. In particular, the steering controller 78 is provided to receive a parking assist enable signal (TO_PA_Enable) and a desired front road wheel angle signal (FWA_Des) from either the environment sensing system 84 or the brake controller 86. The desired front road wheel angle signal (FWA_Des) indicates a desired front road wheel angle that will be utilized for automatically steering the vehicle 10. The parking assist enable signal (TO_PA_Enable) requests that the steering controller 78 enter into a parking assist mode of operation. In the parking assist mode of operation, the steering controller 78 controls operation of the motor 82 for automatically steering the vehicle 10 to a desired front road wheel angle indicated by a desired front road wheel angle, based on signals received the handwheel torque sensor 70, the vehicle speed sensor 72, the handwheel position sensor 74, and the handwheel velocity sensor 76, as will be discussed in further detail below.

Referring to FIGS. 1 and 2, the motor control circuit 80 is provided to receive control signals from the steering controller 78 and to generate electrical currents for controlling operation of the motor 82. As shown, the motor control circuit 80 is electrically coupled between the steering controller 78 and the motor 82. The motor 82 is configured to drive the worm 30 which is operably coupled to the worm gear 28 for moving the lower steering shaft, the steering mechanism 36, tie rods 38, 40, steering knuckles 42, 44, toward an operational position wherein the road wheels 46, 48 have a desired front road wheel angle.

The environment sensing system 84 is provided to determine the environment surrounding the vehicle 10 for determining both a desired parking position on or proximate a roadway and a desired front road wheel angle for parking the vehicle 10 in the desired parking position. The environment sensing system 84 can comprise a controller (not shown) and one or more sensors including radar sensors, infrared sensors, or the like, configured to detect the environment surrounding the vehicle 10. As noted above, the environment sensing system 84 can generate the parking assist enable signal (TO_PA_Enable) and the desired front road wheel angle signal (FWA_Des).

The brake controller 86 is provided to generate the parking assist enable signal (TO_PA_Enable) and the desired front road wheel angle signal (FWA_Des) which is received by the steering controller 78.

It should be noted that in alternative embodiments, the parking assist enable signal (TO_PA_Enable) and the desired front road wheel angle signal (FWA_Des) received by the steering controller 78 could be generated by other controllers or systems, other than the brake controller 86 and the environment sensing system 84.

The transmission controller 88 is provided to generate a transmission gear selection signal (Gear_Sel) indicating a predetermined transmission gear in vehicle 10 is being utilized, which is received by the steering controller 78.

The battery 90 provides electrical power to the steering controller 78 and the motor control circuit 80. As shown, the battery 90 is electrically coupled to the steering controller 78 and the motor control circuit 80.

Referring to FIGS. 3-9, a method for controlling the vehicle steering system 12 will now be described. The method can be implemented utilizing the control system 14 described above. In particular, the method can be implemented utilizing software algorithms executed within the steering controller 78 of the control system 14. The method comprises a main routine, a parking assist enable control subroutine, a road wheel angle control subroutine, a transition control subroutine, and a handwheel angle conversion subroutine. The main routine comprises steps 100-110. The parking assist enable control subroutine comprises steps 120-132 and the road wheel angle control subroutine comprises steps 140-160. The transition control subroutine comprises steps 170-176 and the handwheel angle conversion subroutine comprises steps 180-184.

At step 100, the main routine of steering controller 78 executes a parking assist enable control subroutine to determine a parking assist enable signal (TO_PA_Enable).

At step 102, the main routine of steering controller 78 executes a road wheel angle control subroutine to determine an intermediate desired torque command signal (TO_PA_Torq_Cmd).

At step 104, the main routine of steering controller 78 executes a transition control subroutine to determine a transition-smoothed parking assist enable signal (TO_PA_En_Smooth).

At step 106, the main routine of steering controller 78 executes a handwheel angle conversion subroutine to determine a front road wheel angle signal (FWA).

At step 108, the main routine of steering controller 78 determines a desired torque command signal (TO_PA_Cmd) by multiplying the intermediate desired torque command signal (TO_PA_Torq_Cmd) by the transition-smoothed parking assist enable signal (TO_PA_En_Smooth).

At step 110, the main routine of steering controller 78 sends the desired torque command signal (TO_PA_Cmd) to the motor control circuit 80 which controls an operational position of the motor 82 based on the desired torque command signal (TO_PA_Cmd). After step 110, the main routine is exited.

Figure 4:
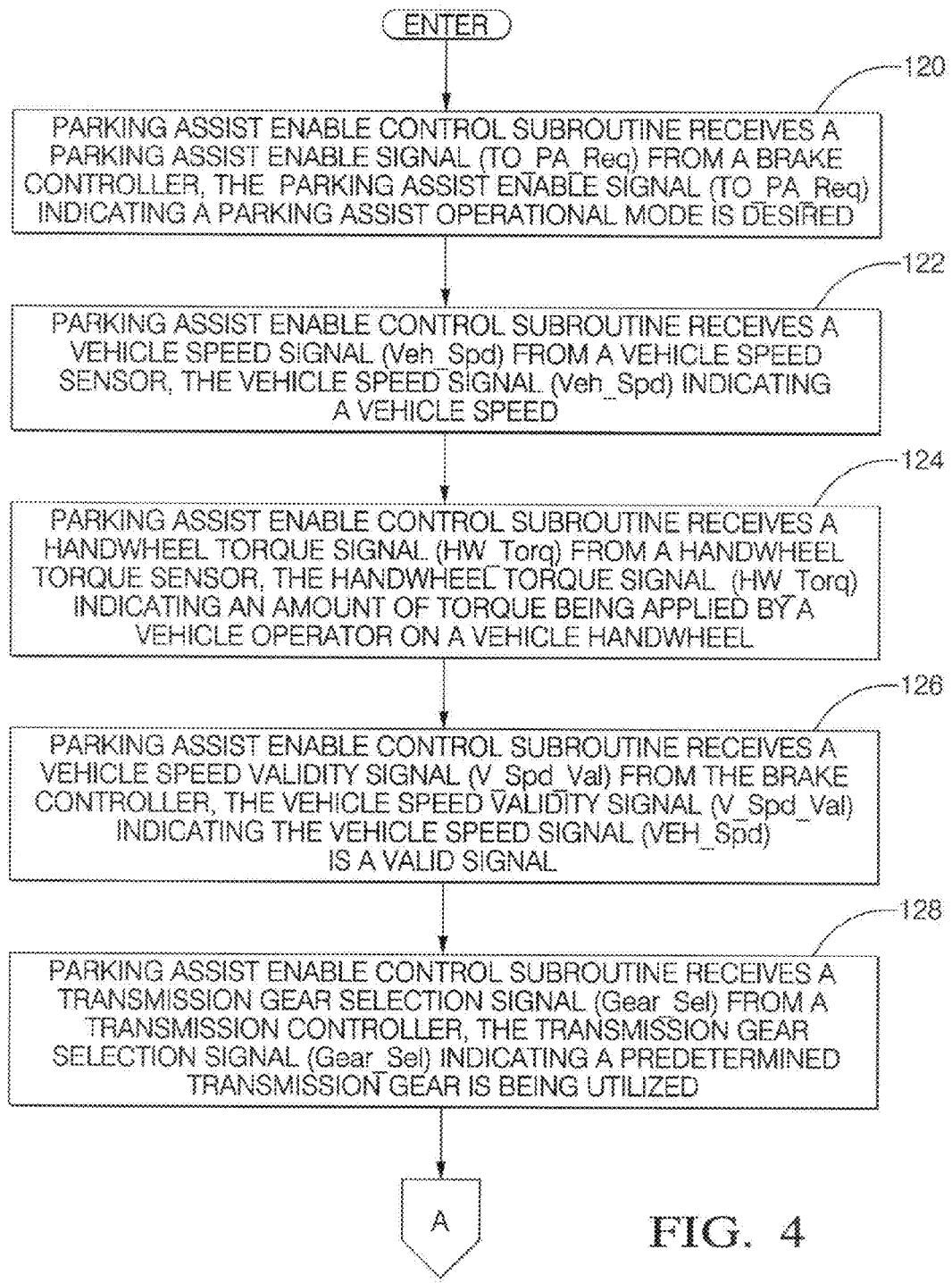
Figure 5:
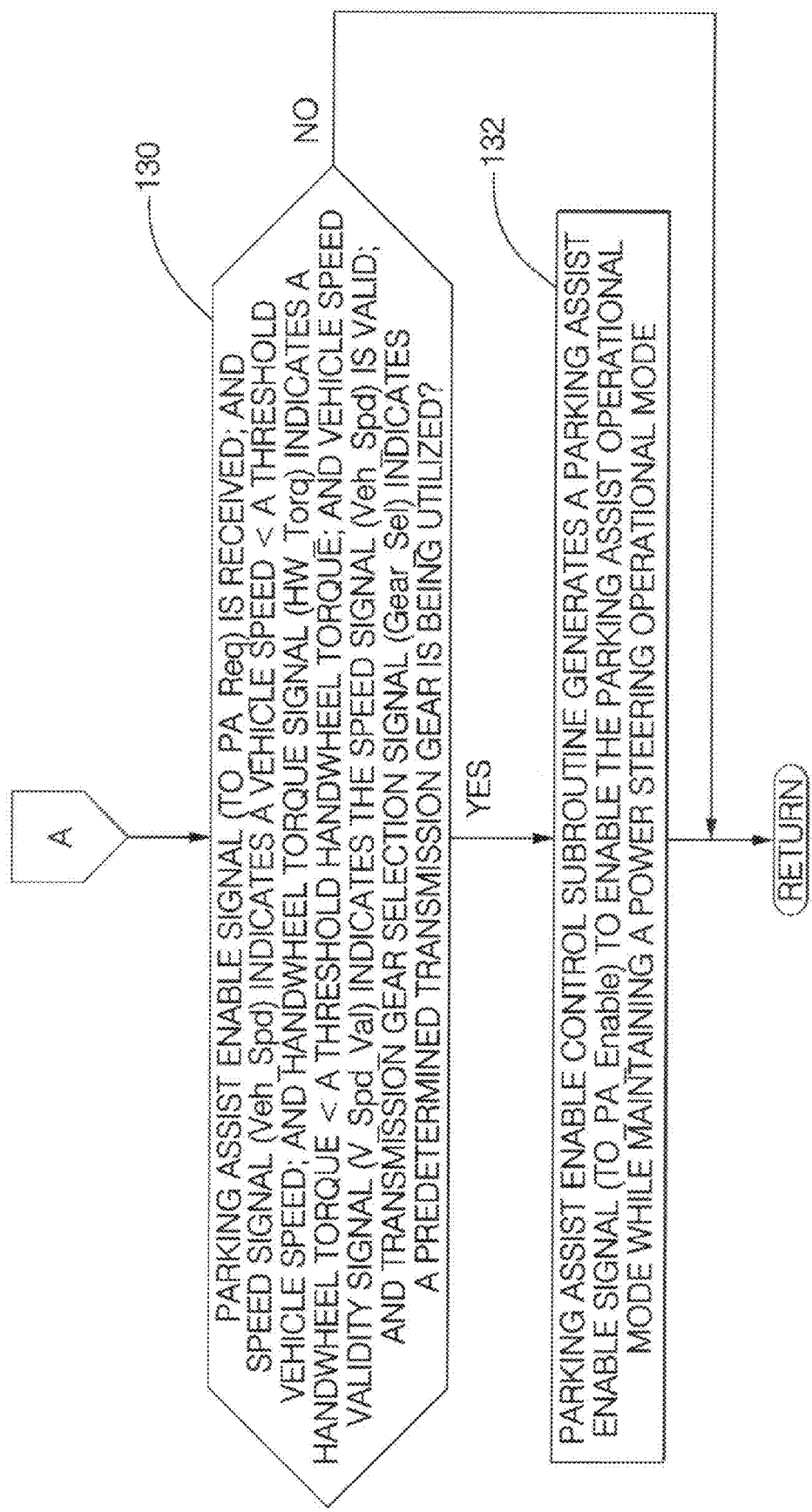

Referring to FIGS. 4 and 5, the steps performed by the parking assist enable control subroutine will now be described.

At step 120, the parking assist enable control subroutine receives a parking assist enable signal (TO_PA_Req) from the brake controller 86. The parking assist enable signal (TO_PA_Req) indicates a parking assist operational mode is desired.

At step 122, the parking assist enable control subroutine receives a vehicle speed signal (Veh_Spd) from the vehicle speed sensor 72. The vehicle speed signal (Veh_Spd) indicates a speed of the vehicle 10.

At step 124, the parking assist enable control subroutine receives a handwheel torque signal (HW_Torq) from the handwheel torque sensor 70. The handwheel torque signal (HW_Torq) indicates an amount of torque being applied by a vehicle operator on the vehicle handwheel 20.

At step 126, the parking assist enable control subroutine receives a vehicle speed validity signal (V_Spd_Val) from the brake controller 86. The vehicle speed validity signal (V_Spd_Val) indicates the vehicle speed signal (Veh_Spd) is a valid signal.

At step 128, the parking assist enable control subroutine receives a transmission gear selection signal (Gear_Sel) from the transmission controller 88. The transmission gear selection signal (Gear_Sel) indicates a predetermined transmission gear is being utilized by a vehicle transmission (not shown).

At step 130, the parking assist enable control subroutine makes a determination as to whether: (i) parking assist enable signal (TO_PA_Req) is received, and (ii) speed signal (Veh_Spd) indicates a vehicle speed less than a threshold vehicle speed, and (iii) handwheel torque signal (HW_Torq) indicates a handwheel torque less than a threshold handwheel torque, and (iv) vehicle speed validity signal (V_Spd_Val) indicates the speed signal (Veh_Spd) is valid, and (v) transmission gear selection signal (Gear_Sel) indicates a predetermined transmission gear is being utilized. If the value of step 130 equals "yes", the parking assist enable control subroutine advances to step 132. Otherwise, the parking assist enable control subroutine is exited.

At step 132, the parking assist enable control subroutine generates a parking assist enable signal (TO_PA_Enable) to enable the parking assist operational mode while maintaining a power steering operational mode. After step 132, the parking assist enable control subroutine is exited.

Figure 6:
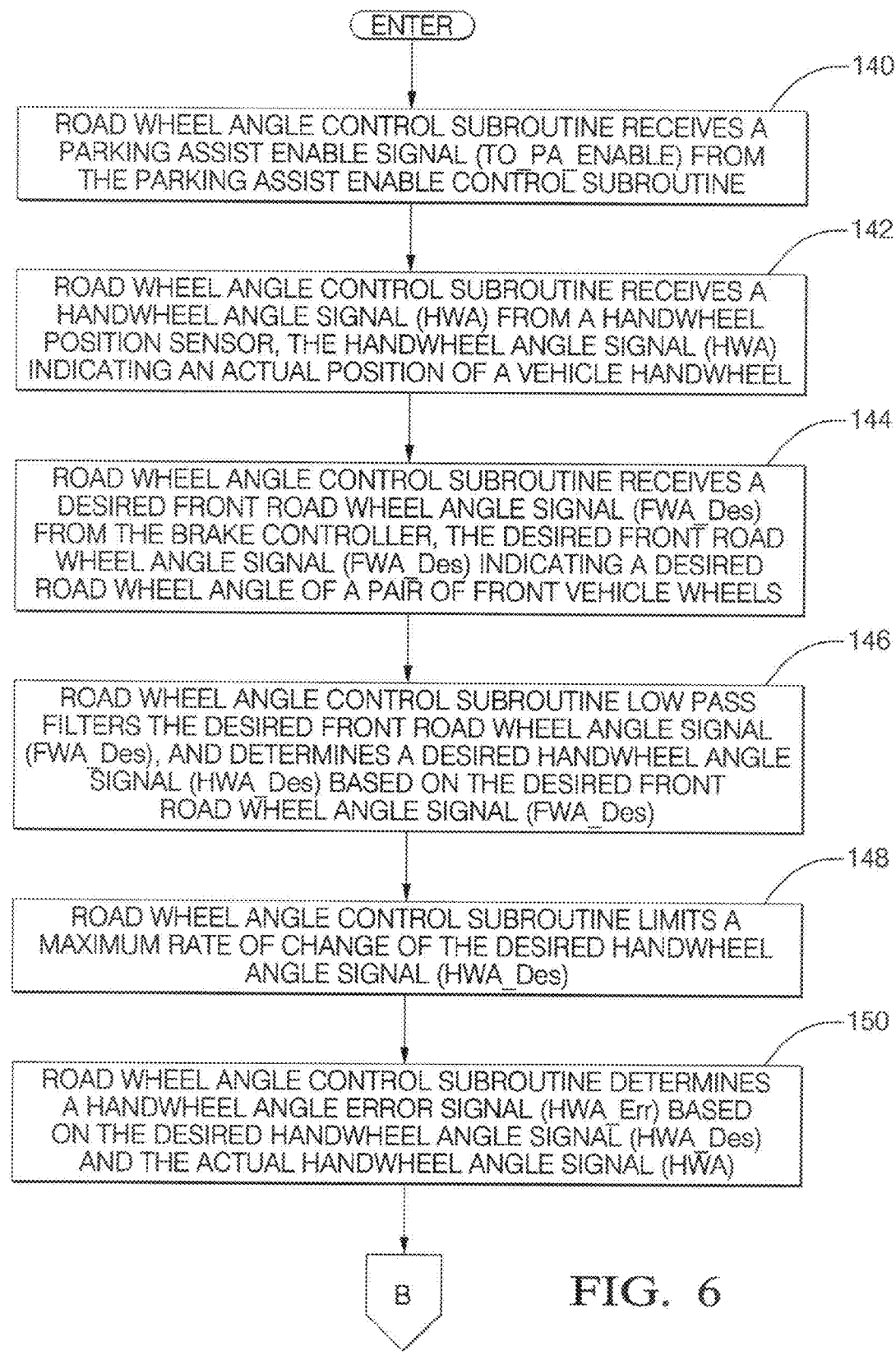
Figure 7:
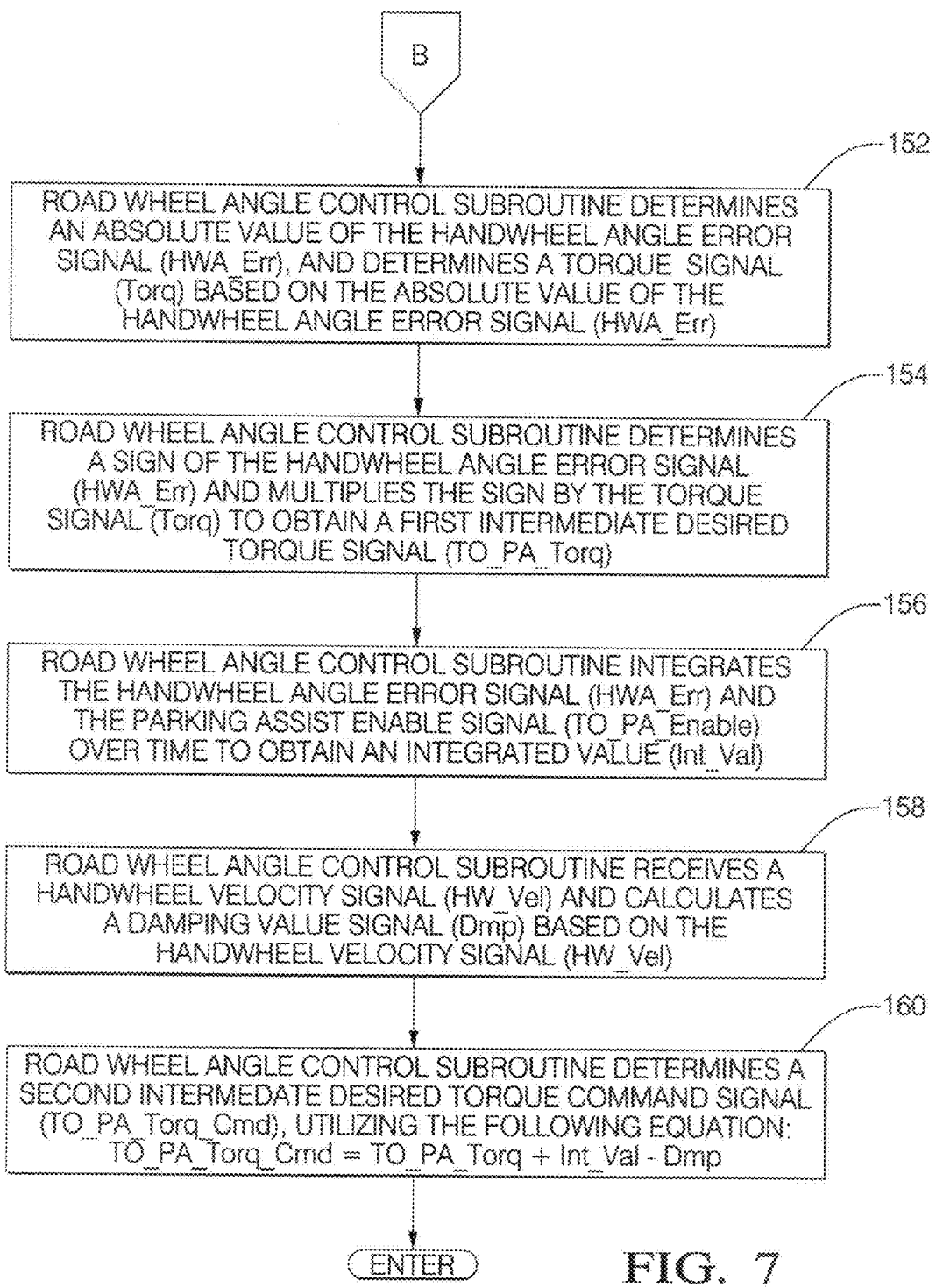

Referring to FIGS. 6 and 7, the steps performed by the road wheel angle control subroutine will now be described.

At step 140, the road wheel angle control subroutine receives a parking assist enable signal (TO_PA_Enable) from the parking assist enable control subroutine.

At step 142, the road wheel angle control subroutine receives a handwheel angle signal (HWA) from the handwheel position sensor. The handwheel angle signal (HWA) indicates an actual angular position of the vehicle handwheel 20.

At step 144, the road wheel angle control subroutine receives a desired front road wheel angle signal (FWA_Des) from the brake controller 86. The desired front road wheel angle signal (FWA_Des) indicates a desired road wheel angle of the pair of front vehicle wheels 46, 48.

At step 146, the road wheel angle control subroutine low pass filters the desired front road wheel angle signal (FWA_Des), and determines a desired handwheel angle signal (HWA_Des) based on the desired front road wheel angle signal (FWA_Des).

At step 148, the road wheel angle control subroutine limits a maximum rate of change of the desired handwheel angle signal (HWA_Des).

At step 150, the road wheel angle control subroutine determines a handwheel angle error signal (HWA_Err) based on the desired handwheel angle signal (HWA_Des) and the actual handwheel angle signal (HWA).

At step 152, the road wheel angle control subroutine determines an absolute value of the handwheel angle error signal (HWA_Err), and determines a torque signal (Torq) based on the absolute value of the handwheel angle error signal (HWA_Err).

At step 154, the road wheel angle control subroutine determines a sign of the handwheel angle error signal (HWA_Err) and multiplies the sign by the torque signal (Torq) to obtain a first intermediate desired torque signal (TO_PA_Torq).

At step 156, the road wheel angle control subroutine integrates the handwheel angle error signal (HWA_Err) and the parking assist enable signal (TO_PA_Enable) over time to obtain an integrated value (Int_Val).

At step 158, the road wheel angle control subroutine receives a handwheel velocity signal (HW_Vel) and calculates a damping value signal (Dmp) based on the handwheel velocity signal (HW_Vel).

At step 160, the road wheel angle control subroutine determines a second intermediate desired torque command signal (TO_PA_Torq_Cmd), utilizing the following equation: TO_PA_Torq_Cmd=TO_PA_Torq+Int_Val−Dmp. After step 160, the road wheel angle control subroutine is exited.

Figure 8:
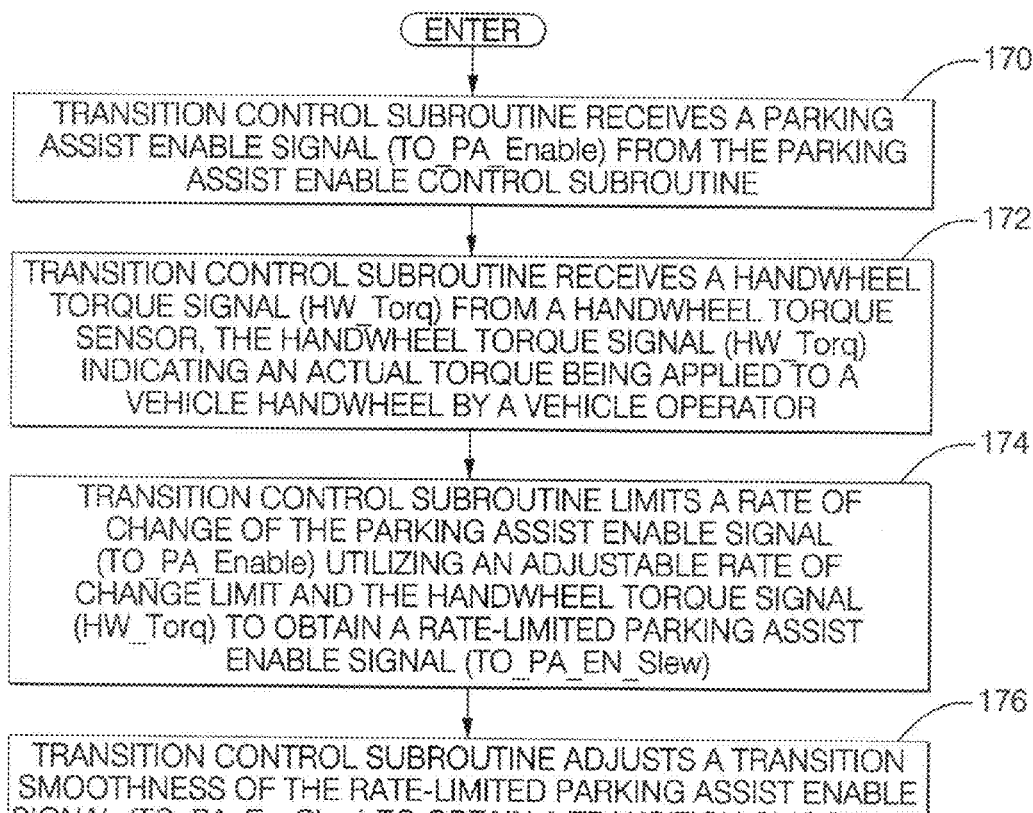

Referring to FIG. 8, the steps performed by the transition control subroutine will now be described.

Figure 10:
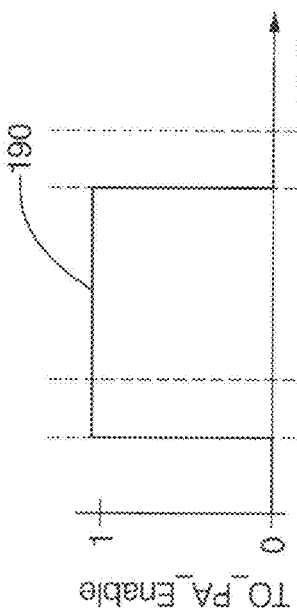
FIGS. 10-12 are schematics of signals generated by the control system of FIG. 1 for controlling the steering system when a relatively high amount of torque is applied a vehicle handwheel.
Figure 13:
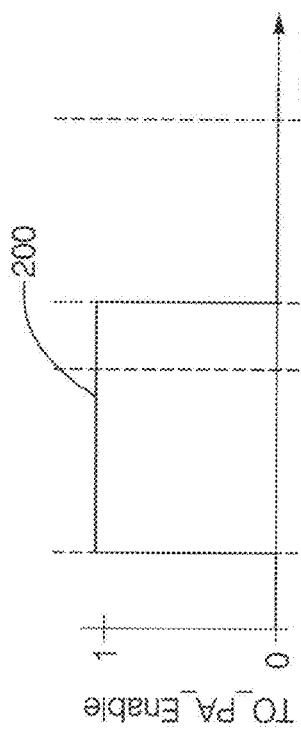
FIGS. 13-15 are schematics of signals generated by the control system of FIG. 1 for controlling the steering system when a relatively low amount of torque is applied a vehicle handwheel.

At step 170, the transition control subroutine receives a parking assist enable signal (TO_PA_Enable) from the parking assist enable control subroutine. Referring to FIG. 10, for example, when a relatively high handwheel torque is being applied to the vehicle handwheel 20, the transition control subroutine can receive a parking assist enable signal (TO_PA_Enable) 190. Referring to FIG. 13, for example, when a relatively low handwheel torque is being applied to the vehicle handwheel 20, the transition control subroutine can receive a parking assist enable signal (TO_PA_Enable) 200.

At step 172, the transition control subroutine receives a handwheel torque signal (HW_Torq) from the handwheel torque sensor 70. The handwheel torque signal (HW_Torq) indicates an actual torque being applied to the vehicle handwheel 20 by a vehicle operator.

Figure 11:
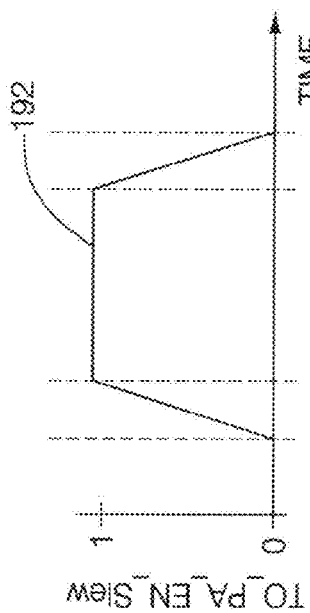
Figure 14:
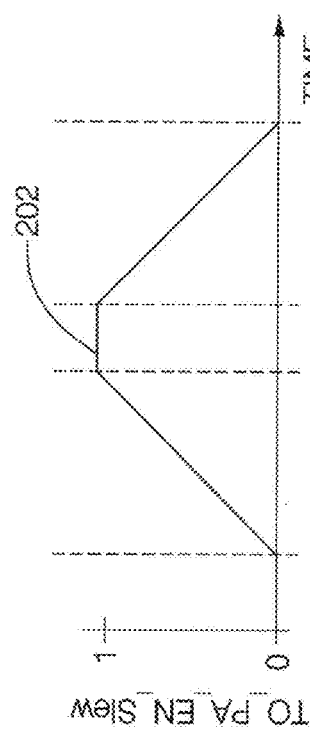

At step 174, the transition control subroutine limits a rate of change of the parking assist enable signal (TO_PA_Enable) utilizing an adjustable rate of change limit and the handwheel torque signal (HW_Torq) to obtain a rate-limited parking assist enable signal (TO_PA_En_Slew). Referring to FIG. 11, for example, when a relatively high handwheel torque is being applied to the vehicle handwheel 20, the transition control subroutine can receive a rate-limited parking assist enable signal (TO_PA_En_Slew) 192. Referring to FIG. 14, for example, when a relatively low handwheel torque is being applied to the vehicle handwheel 20, the transition control subroutine can receive a rate-limited parking assist enable signal (TO_PA_En_Slew) 202.

Figure 12:
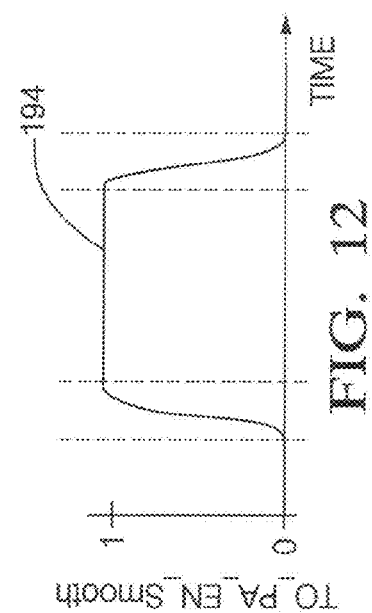
Figure 15:
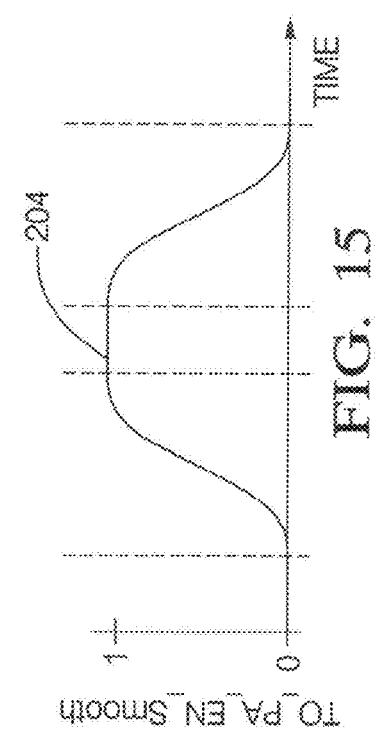

At step 176, the transition control subroutine adjusts a transition smoothness of the rate-limited parking assist enable signal (TO_PA_En_Slew) to obtain a transition-smoothed parking assist enable signal (TO_PA_En_Smooth). Referring to FIG. 12, for example, when a relatively high handwheel torque is being applied to the vehicle handwheel 20, the transition control subroutine can receive a transition-smoothed parking assist enable signal (TO_PA_En_Smooth) 194. Referring to FIG. 15, for example, when a relatively low handwheel torque is being applied to the vehicle handwheel 20, the transition control subroutine can receive a transition-smoothed parking assist enable signal (TO_PA_En_Smooth) 204. After step 176, the transition control subroutine is exited.

Figure 9:
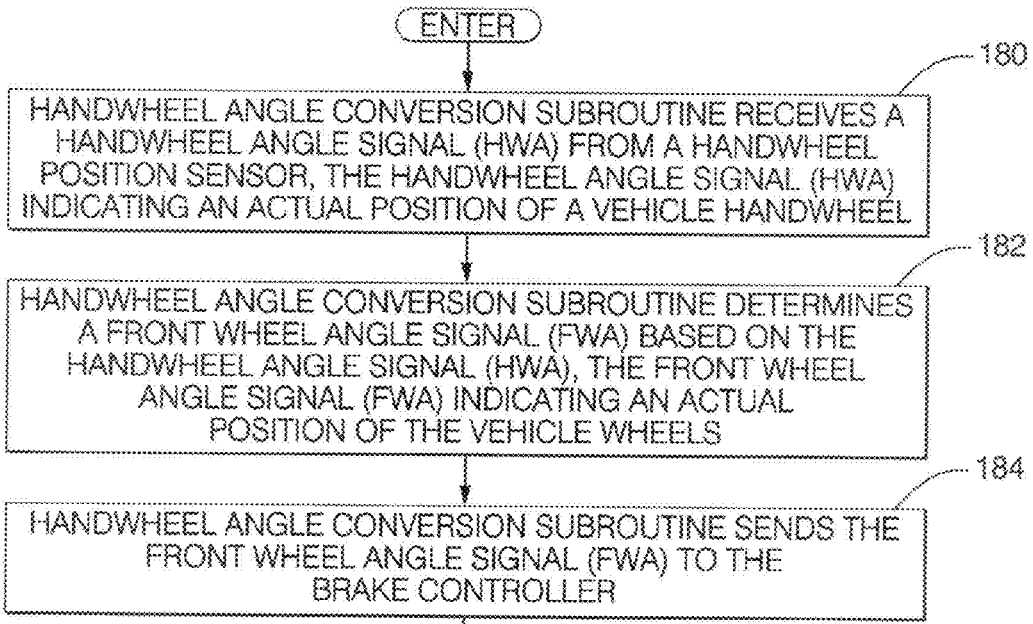

Referring to FIG. 9, the steps performed by the handwheel angle conversion subroutine will now be described.

At step 180, the handwheel angle conversion subroutine receives a handwheel angle signal (HWA) from the handwheel position sensor 74. The handwheel angle signal (HWA) indicates an actual position of the vehicle handwheel 20.

At step 182, the handwheel angle conversion subroutine determines a front wheel angle signal (FWA) based on the handwheel angle signal (HWA). The front wheel angle signal (FWA) indicating an actual position of the vehicle wheels 46, 48.

At step 184, the handwheel angle conversion subroutine sends the front road wheel angle signal (FWA) to the brake controller 86. After step 184, the handwheel angle conversion subroutine is exited.

The inventive systems and methods for controlling a vehicle steering system represent a substantial improvement over other systems and methods. In particular, the inventive systems and methods for controlling a vehicle steering system provide a technical effect of generating a desired motor torque signal for controlling a power steering motor in a parking assist operational mode based on a desired front road wheel angle signal and a parking assist request signal.

As described above, the above-described method can be embodied in the form of computer-implemented software algorithms and apparatuses for practicing those processes. In an exemplary embodiment, the method is embodied in computer program code executed by one or more elements. The present method may be embodied in the form of computer program code containing instructions stored in tangible media, such as floppy diskettes, CD-ROMs, hard drives, flash memory, or any other computer-readable storage medium, wherein, when the computer program code is loaded into and executed by a computer, the computer becomes an apparatus for practicing the invention.

While the invention has been described with reference to exemplary embodiments, it will be understood by those skilled in the art that various changes may be made and equivalent elements may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Further, the use of the terms a, an, etc. do not denote a limitation of quantity, but rather denote the presence of at least one of the referenced item.

What is claimed is:

1. A method for controlling a vehicle steering system, comprising:
    receiving a desired front road wheel angle signal at a computer, the desired front road wheel angle signal being indicative of a desired front road wheel angle of vehicle wheels;
    receiving a parking assist request signal at the computer indicating a parking assist operational mode is desired for automatically parking a vehicle;
    receiving a vehicle speed signal indicative of a vehicle speed at the computer;
    receiving a handwheel torque signal indicative of an amount of torque applied to a vehicle handwheel at the computer;
    enabling a parking assist control mode to automatically control the operational position of vehicle wheels during automatic vehicle parking, utilizing the computer, when the parking assist request signal is received, and the vehicle speed signal indicates a vehicle speed is less than a first threshold vehicle speed, and the handwheel torque signal indicates an amount of handwheel torque is less than a threshold handwheel torque; and
    generating a desired motor torque signal for controlling a power steering motor in the parking assist control mode when the parking assist control mode is enabled, utilizing the computer, based on the desired front road wheel angle signal.

2. The method of claim 1, wherein the enabling the parking assist control mode is further based on a transmission gear.

3. The method of claim 1 wherein the parking assist control mode is enabled while maintaining a power steering operational mode.

* * * * *